United States Patent Office 3,543,001
Patented Nov. 24, 1970

3,543,001
HEAT ACCUMULATION APPARATUS FOR HEAT EMITTING UNITS AT TEMPERATURES ABOVE 100° C.
Axel Nore Alexander Axlander, 47 Ostermalmsgatan, S-114 26 Stockholm, Sweden
Filed Nov. 15, 1968, Ser. No. 776,167
Claims priority, application Sweden, Dec. 6, 1967, 16,777/67
Int. Cl. F24h 7/02
U.S. Cl. 219—326   7 Claims

ABSTRACT OF THE DISCLOSURE

A heat accumulation apparatus comprising an electrically heated container filled with a high boiling liquid and communicating with an expansion vessel, heat emitting units and control valves being inserted in liquid circulation circuits connected to said container.

BACKGROUND OF THE INVENTION

Figure 1:
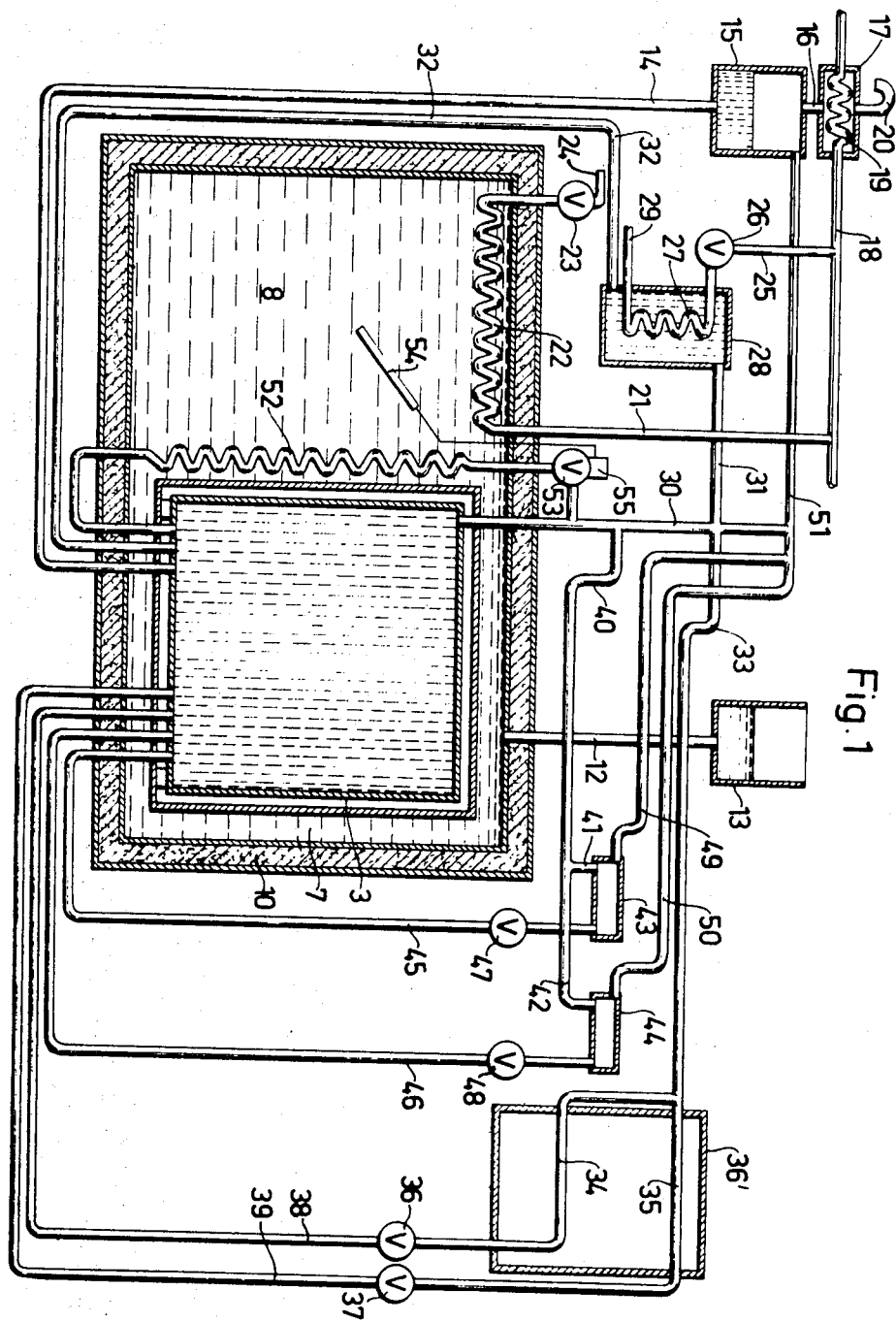

In such provinces where in the daytime the electric power available must to a great extent be used for industrial purposes, it may be desirable to cut the load peaks by transferring some consumption of electric energy to the low consumption periods, particularly to the nighttime. In order to encourage such an action, a cheaper night rate is today used in certain cases. Sometimes an increased prohibitive rate is instead used between determined hours of the day. In the future, it is to be expected that such measures will become more common as the demand for power increases. For the suppliers of electric energy a uniform consumption is desired. In a domestic distribution net containing electric stoves there are marked peaks at cooking times, particularly in the afternoon. During the dark seasons, the energy for illumination is increased. However, by accumulation of energy during the low consumption periods it is possible to cut the peaks so that a given main net can be used for a much greater number of consumers than otherwise, i.e., without accumulation.

SUMMARY OF THE INVENTION

The invention relates to a heat accumulation apparatus which may be heated preferably by electric energy, during an arbitrarily chosen period of time to be used later on, likewise at an arbitrarily chosen time, for operating heat emitting units, such as cooking plates or ovens which require a rather high operating temperature, considerably higher than the boiling point of water. The apparatus comprises a closed, heat insulated container preferably provided with electric heating elements and filled with a liquid having a high boiling point. The container is in communication with an expansion vessel disposed at a higher level. One or more heat emitting units are connected in liquid circulation circuits provided with shut-off valves and placed at a lower level than the expansion vessel, said circuits extending from the upper part of the container and entering the lower part thereof. At liquid temperatures below the operating temperature normally used, i.e., before starting or during inoperative periods of long duration, for instance, the liquid need not fill the container entirely and consequently it does not rise into the expansion vessel.

By switching on the heating elements, the liquid in the container is heated to a predetermined temperature below the boiling point of the liquid in question and this temperature may in the known way be controlled by means of a thermostat. When the heated liquid expands, the surplus rises into the expansion vessel from which liquid returns to the container at dropping temperature. Thus, it is ensured that the container is always entirely filled with liquid at operating temperatures. The heat insulation must be effective so that the emission of heat to the ambient atmosphere is as slight as possible. For this purpose, the container may be provided with a heat insulating housing including a water jacket which may be used for heating water or for operation of a central heating plant.

On opening the shut-off valves of the heat emitting units, a self-circulation occurs through the circuits, as the amounts of liquid cooled in said units have a higher specific gravity and therefore tend to move downwardly. Thus, the cooled liquid flows into the container at the bottom where it forms a progressively rising layer which does not noticeably mix with the warmer layer of liquid on top thereof. The latter layer substantially maintains its given initial temperature, and therefore no additional supply of heat is required to keep the heat emitting units at a constant operating temperature until almost the entire amount of liquid in the container has circulated through said heat emitting units.

The intended function of the apparatus is promoted by the use of a liquid having not only a high boiling point and an advantageous specific heat but also low heat conduction and a high volume expansion coefficient. Several such liquids are commercially available, and as an example a liquid sold under the trade name "Gilotherm ALD" may be mentioned. This liquid has a boiling point of about 350° C. and a specific heat of .5, the volume expansion coefficient is about .0009 and the conductivity is about .1 kcal. per meter, hour and ° C. However, the invention is by no means limited by this example, particularly as new and improved heat accumulating liquids continuously appear.

Even regardless of the cost for electric current, the invention involves advantages. Thus, the heat emitting units, such as cooking plates, ovens etc., may accurately keep a determined temperature, which is not possible in the case of direct electric heating. In the latter case the temperature in the pots or ovens becomes highly dependent on the heating energy consumed. While using heated liquid for heat emission at high temperatures, hot water of high temperature for various purposes may simultaneously be obtained.

DESCRIPTION OF THE PREFERRED EMBODIMENT

Figure 2:
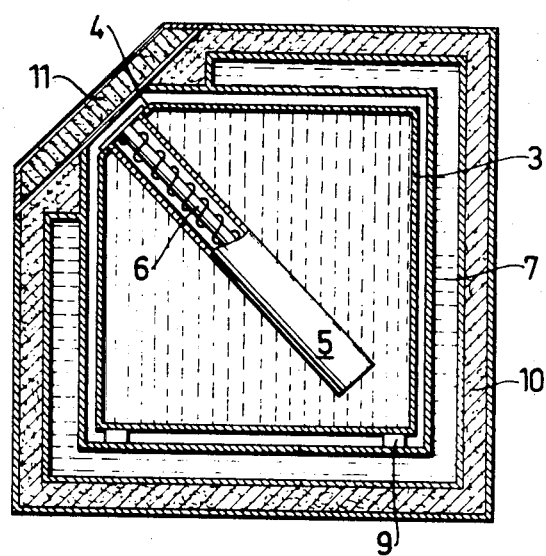

In the accompanying drawing, FIG. 1 shows diagrammatically a vertical section through one embodiment of the apparatus. FIG. 2 shows a vertical section through the heat accumulating container in a plane perpendicular to that in FIG. 1.

In the embodiment shown, a heat accumulating container 3 is almost cubic except for an inclined wall portion 4 (FIG. 2) at the top of one side. Said inclined wall portion 4 carries a number of parallel tubes 5 welded thereto and directed diagonally into the container. The tubes are closed at their inner ends but open at their outer ends to receive electric resistance elements 6 which, on supply of current, heat the liquid in the container 3.

The electric connections are not shown as they may be of any common type corresponding to the varying existing requirements as to function and security. It may be sufficient to mention that the supply of current may be controlled by means of one or more temperature responsive members influenced by the temperature of the accumulation liquid to switch on or off the heating elements in groups at one or more levels in dependence on the temperature of the liquid. In cases where, for tax reasons or other reasons, no electric energy should be drawn or at least the amount drawn should be restricted during determined periods of time, a clock relay may be provided to cut off the supply of current wholly or partly during said hours. A manual shunting of such a blocking clock relay may be desirable in case of an unanticipated need where the cost of the current must not matter. Such a shunting may then be carried out by means of a manually actuated switch which short-circuits the open contacts of the clock relay.

To prevent overheating of the liquid, limiting thermostats should be provided to shut off the electric current if the temperature of the liquid exceeds a critical maximum value, in the present example preferably slightly above 300° C. Such a limiting thermostat should conveniently also be provided in the water storage tank.

Except for the wall portion 4, the container 3 is wholly encased in a jacket vessel 7 adapted to be kept filled with water. In the embodiment shown, said vessel 7 is widened at one side of the container to form a large tank 8. In the space between the container 3 and the jacket vessel 7, radiation insulating foils or other heat insulating material may be provided to limit the heat transmission from the container 3 to the vessel 7. The bottom wall of the container 3 may be provided with feet 9 resting on the underlying inner wall of the jacket vessel 7. The vessel 7 with the tank 8 is, in turn, entirely encased in heat insulation 10, the purpose of which is to prevent any noticeable transmission of heat to the ambient air. Opposite the inclined wall portion 4 of the container 3, the heat insulating casing 10 is provided with a heat insulated cover 11 which may be detached to permit a change of resistance elements, when required.

A tube 12 extends vertically upwards from the jacket vessel 7 to an expansion vessel 13 to ensure that the water tank 8 is always kept filled. The size of the tank 8 is calculated such that the temperature of the water contained therein will not exceed a determined maximum temperature, 90° C., for instance, even if the container 3 is kept at operating temperature for a limited period of time without drawing heat from the water. In the case of long periods without withdrawal of heat from the water, there may be a risk that the water in the jacket 7 and the tank 8 begins to boil. To prevent boiling, it is advisable to provide a thermostat in the water jacket to switch off the electric current when the temperature of the water has reached about 90° C.

A conduit 14 extends from the liquid container 3 to an expansion vessel 15 disposed at a higher level and adapted to receive the excess of liquid expelled from the container at heating. Conveniently, one vertical wall of the expansion vessel 15 contains a window for observation of the liquid level which may be a measure of the degree of heating. The vessel 15 is closed except for a gas outlet pipe 16 extending from its top and ending in the bottom of a condenser 17 disposed above. A cooling coil 19 in the condenser 17 is connected to a water conduit 18. For reasons of safety, the top of the condenser has a gas vent 20 which does not normally give off any gas, as the amount of gas entering the condenser is slight or, as a rule, non-existent. According to another embodiment, not shown, the condenser may, instead, be built into the upper part of the expansion vessel 15.

From the water conduit 18, which may continue to a place of consumption, not shown, a branch conduit 21 extends to a pipe coil 22 provided in the upper part of the tank 8 and adapted to deliver hot water for household purposes through an outlet 24 provided with a valve 23. Another branch conduit 25 containing a valve 26 extends from the water pipe 18 to another pipe coil 27 in a closed vessel 28 which is connected to the accumulation container 3 in a manner described below to be continuously passed by heating liquid. Although not shown, the vessel 28 should be heat insulated. When the valve 26 is opened, hot water of 100° C. may be obtained from a conduit 29 connected to the pipe coil 27. If desired, the valve 26 may be throttled to limit the flow of water through the coil 27 sufficiently to let only steam flow out from the conduit 29, thus offering a possibility for steam cooking etc. The valve 26 may also be designed as a mixing valve for arbitrary graduation of the temperature of hot tap water.

A main conduit 30 for supply of heated liquid to the various heat emitting units extends from the upper part of the container 3. A branch conduit 31 from the conduit 30 leads to the vessel 28, from the bottom of which the liquid is then returned through a conduit 32 to the bottom of the container 3. Another branch conduit 33 extends to two coils 34 and 35 in an oven, diagrammatically represented at 36'. Return conduits 38 and 39 provided with valves 36 and 37, respectively, extend from the coils 34 and 35 to the bottom of the container 3.

A third branch conduit 40 from the main conduit 30 is also divided into two branches 41 and 42 which are connected to the interior of hollow stove plates 43 and 44, respectively. As indicated in the drawing, the stove plates may conveniently be cylindrical. Return conduits 45 and 46 with shut-off valves 47 and 48, respectively, extend from the plates 43 and 44 to the bottom of the container 3.

Gas vent pipes 49 and 50 extending from the topmost part of the cavities in the plates 43 and 44 are, together with the main conduit 30, connected to a collecting pipe 51 which ends in the upper part of the expansion vessel 15. The purpose thereof is to remove any gases or vapors formed so that the liquid system is always kept filled with liquid only. The escaping vapors are condensed in the expansion vessel 15 and the condenser 17 disposed thereabove.

A fourth branch conduit 52 extending downwardly from the main conduit 30 in the form of a coil passes through the water tank 8 and ends in the bottom of the container 3. The conduit 52 is provided with a valve 53 which is automatically controlled by a regulator 55 on impulses from a temperature responsive member 54 inserted in the water tank 8, whereby the heat emitting coil 52 maintains a predetermined water temperature, 85° or 90° C., for instance.

When the liquid in the container 3 has been heated to its operating temperature, and one or more of the valves 36, 37, 47 and 48 in the return conduits are opened, a liquid circulation through the associated heat emitting units automatically takes place. The temperature of said units is dependent on the speed of flow of the liquid, which may be controlled by throttling the valves. In normal operation, the circulation should be adjusted such that the difference in temperature between the liquid returned and the over-lying hot liquid layer in the container 3 amounts to about 50° C. This also reduces the risk of the two liquid layers getting mixed to an unpermissible extent. When using a liquid heated to 300° C., the stove plates and the oven may be given a temperature of about 275° C. which is sufficient for most cooking purposes. On the other hand, this temperature is moderate enough to avoid a boiling-over or burning otherwise easily occurring.

Conveniently, the heat accumulation container 3 is dimensioned such that the heat content of the liquid heated to maximum temperature is sufficient for one day's normal consumption in a household of medium size. The water heater 28 renders possible a shortening of the cooking time in combination with good heat economy. A cooking plate, of whatever kind it may be, has a low efficiency, while the water heater described has an efficiency of almost 100%. Thus, heat may be saved by initially filling a pot with boiling hot water from the tap 29.

In such singular cases where a heat consumption of long duration is required, there should be means for manual connection of one or more of the heaters 6 or special heaters with direct or indirect effect. To facilitate manual operation in such cases, it is convenient to provide the liquid container 3 with temperature indicators for indicating the temperature of the liquid at varying levels. In normal operation, the accumulator is charged as soon as the ratio between heating power withdrawn, on the one hand, and heating power supplied, on the other hand, permits charging within the scope of any limits set.

The device illustrated in the drawing may be modified in many different respects. In practice, the device is usually built into a compact assembly. In case room heating is also desired, the tank 8 may serve as boiler for the operation of a central heating plant.

In addition to the embodiment shown in the drawing and described above, the following details and varieties may, inter alia, be pointed out. Useful accumulation liquids may partly have different properties in chemical as well as in physical respects. In view of the risk of chemical influence, the heating effect per square unit of the tubes 5 should be limited, but in case of most liquids known it will hardly be necessary to go below about .5 w./sq. cm. If desired, the tube area may be increased by means of longitudinal pleats, flanges or the like, which do, not hinder the movement of the liquid.

If desired, the heating tubes 5, 6 may be disposed in a separate, preferably smaller vessel communicating with the vessel 3 through conduits. This arrangement may be such that the liquid in the smaller vessel is always heated to a determined output temperature, 300° C., for instance, before it is introduced in the larger vessel. This procedure may be controlled by a thermostat adapted to let only liquid of sufficiently high temperature flow out from the smaller vessel.

The outflow and return conduits shown in FIG. 1 are arranged such that the warm liquid should be discharged at the top and the returning liquid should be introduced at the bottom. In practice, however, it may happen that the warmest layer of liquid is located slightly below the top side of the container 3 owing to unavoidable losses of heat in direction upwards. In view thereof, the ascending pipe 30 may conveniently extend somewhat into the container 3. In such an embodiment, however, a separate gas vent pipe must extend from the top of the container 3.

To facilitate the stratification of liquid mentioned above, so that the liquid returning to the vessel so to speak "senses" its level in dependence on temperature and density, the return conduits may be extended from the bottom of the vessel to varying levels. In another embodiment, the return pipes drawn up through the vessel from its bottom may be provided with perforated or slitted walls. Returning liquid then flows out into the surrounding liquid body through the slits at the level where the temperature in the vessel is equal to that of the liquid returning, and thereby an undesirable mixture of liquids is prevented.

The disposal of the valves in the return pipes in the way shown in the drawing is not critical but may be convenient in view of the lower temperature of the return liquid. At times it may be advantageous to dispose valves in the supply pipes. Also, it may occur that valves in supply pipes as well as in return pipes are to be preferred.

At least at present, electric heating represents the larger and more important field for the use of the invention. However, it is possible to use other heating means, such as gas, for instance. As regards the gas distribution and the capacity of the distribution nets, load peaks and utilization possibilities, there are the same basic problems and possibilities as in the case of electric distribution nets.

What I claim is:
1. A heat accumulation apparatus adapted to be heated to temperatures above 100° C. for operating heat emitting units, said apparatus comprising a heat insulated closed container filled with a liquid having a high boiling point, means for heating said liquid in said container, a jacket vessel filled with water and at least partly encasing said container, an expansion vessel in open communication with the atmosphere and disposed at a higher level than said container in communication therewith, at least one heat emitting unit, and a liquid circulation circuit connecting said container and each unit and including control valves, each said circuit extending from the upper part of the container to each unit and returning to the lower part of the container.

2. Apparatus as claimed in claim 1, wherein said means for heating said liquid in said container comprises an electrical heating unit.

3. Apparatus as claimed in claim 1 comprising a conduit leading to the expansion vessel and extending from the bottom of said container.

4. Apparatus as claimed in claim 1, wherein said expansion vessel is closed, the apparatus further comprising a condenser connected to said expansion vessel and having an outlet vented to the atmosphere.

5. Apparatus as claimed in claim 1, wherein said container as well as each heat emitting unit has a gas vent pipe extending from the top thereof to the upper part of the expansion vessel.

6. Apparatus as claimed in claim 1, wherein each said circuit includes outgoing pipes from said container to each unit and return pipes from each unit to said container, said control valves being provided in said return pipes.

7. Apparatus as claimed in claim 1, wherein said jacket vessel is elongated to form a hot water boiler, a liquid circulation coil being connected to said container and traversing said boiler, a valve in said liquid circulation coil, a regulator controlling the latter said valve and a temperature responsive member in said boiler for actuating said regulator, which in turn controls said valve in said liquid circulation coil.

References Cited
UNITED STATES PATENTS

| | | | |
|---|---|---|---|
| 1,040,688 | 10/1912 | Jones | 237—19 |
| 2,290,347 | 7/1942 | Moore et al. | 237—19 |
| 2,373,731 | 4/1945 | Wilson et al. | 237—19 X |
| 2,841,685 | 7/1958 | Alexander | 219—326 X |
| 3,290,864 | 12/1966 | Harker et al. | 237—66 X |

FOREIGN PATENTS 341,980   10/1959   Switzerland.

ANTHONY BARTIS, Primary Examiner

C. L. ALBRITTON, Assistant Examiner

U.S. Cl. X.R.

126—375; 219—341, 399, 530